United States Patent
Hu et al.

(10) Patent No.: US 11,221,713 B2
(45) Date of Patent: Jan. 11, 2022

(54) ULTRASONIC TOUCH DEVICE AND MEL'HOD, DISPLAY DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Yansheng Hu, Beijing (CN); Jin Sha, Beijing (CN); Zhaobo Jiang, Beijing (CN); Chengcheng Hou, Beijing (CN); Guanglei Yang, Beijing (CN)

(73) Assignees: BOE Technology Group Co., Ltd., Beijing (CN); Hefei BOE Optoelectronics Technology Co., Ltd., Hefei (CN)

( * ) Notice: Subject to any disclaimer, the term of this patent is extended or adjusted under 35 U.S.C. 154(b) by 443 days.

(21) Appl. No.: 16/302,044

(22) PCT Filed: Feb. 7, 2018

(86) PCT No.: PCT/CN2018/075637
§ 371 (c)(1),
(2) Date: Nov. 15, 2018

(87) PCT Pub. No.: WO2019/019606
PCT Pub. Date: Jan. 31, 2019

(65) Prior Publication Data
US 2021/0117022 A1    Apr. 22, 2021

(30) Foreign Application Priority Data

Jul. 26, 2017   (CN) .......................... 201710619284.6

(51) Int. Cl.
*G06F 3/043*   (2006.01)
*G06F 3/041*   (2006.01)

(52) U.S. Cl.
CPC ............ *G06F 3/043* (2013.01); *G06F 3/0412* (2013.01)

(58) Field of Classification Search
None
See application file for complete search history.

(56) References Cited

U.S. PATENT DOCUMENTS

| 2007/0085828 | A1* | 4/2007 | Schroeder | G06F 3/043 |
| | | | | 345/158 |
| 2016/0357279 | A1* | 12/2016 | Choi | G06F 3/04166 |
| 2018/0101711 | A1* | 4/2018 | D'Souza | G06K 9/228 |

FOREIGN PATENT DOCUMENTS

| CN | 203366299 U | 12/2013 |
| CN | 203366300 U | 12/2013 |

(Continued)

OTHER PUBLICATIONS

Chinese Decision of Rejection dated Mar. 5, 2019, from application No. 201710619284.6.

(Continued)

*Primary Examiner* — Aneeta Yodichkas
(74) *Attorney, Agent, or Firm* — Arch & Lake LLP

(57) ABSTRACT

The present disclosure relates to an ultrasonic touch device and a method. The ultrasonic touch device is disposed at a periphery of a display area of an electronic equipment. The ultrasonic touch device includes an ultrasonic ranging module. The ultrasonic ranging module includes a plurality of ultrasonic ranging units detected. The ultrasonic touch device includes a first position determining unit configured to determine a distance between a touch object and the ultrasonic ranging module, and determine a position of the touch object in a first coordinate direction of the display area according to the distance. The ultrasonic touch device includes a second position determining unit configured to determine a position of the touch object in a second coor- (Continued)

dinate direction of the display area according to a position of an ultrasonic ranging unit that receives the reflected ultrasonic waves in the ultrasonic ranging module.

19 Claims, 3 Drawing Sheets

(56) References Cited

FOREIGN PATENT DOCUMENTS

| CN | 104850279 A | 8/2015 |
|----|-------------|--------|
| CN | 104991686 A | 10/2015 |
| CN | 106896955 A | 6/2017 |
| CN | 107291307 A | 10/2017 |

OTHER PUBLICATIONS

International Search Report and Written Opinion dated May 8, 2018, from application No. PCT/CN2018/075637.

\* cited by examiner

ULTRASONIC TOUCH DEVICE AND MEL'HOD, DISPLAY DEVICE

CROSS REFERENCE OF RELATED APPLICATIONS

The present application is based upon International Application No. PCT/CN2018/075637, filed on Feb. 7, 2018, which is based upon and claims the priority of Chinese Patent Application No. 201710619284.6, filed on Jul. 26, 2017, and the entire contents thereof are incorporated herein by reference as part of the present application.

TECHNICAL FIELD

The present disclosure relates to the field of display technologies, and in particular, to an ultrasonic touch device, a display device, and an ultrasonic touch method.

BACKGROUND

A touch screen is an inductive display device that can receive input signals such as touch. When a conductor touches a graphic button (icon) on the screen, an on-screen tactile feedback system can trigger different control commands according to a pre-programmed program, to replace mechanical button panels.

With rapid development of smartphones and tablets, touch screens have been widely used in daily life. Therefore, there is an increasing demand for direct touch control of electronic equipment.

It should be noted that the information disclosed in the foregoing background section is only for enhancement of understanding of the background of the present disclosure and therefore may include information that does not constitute related art that is already known to those of ordinary skill in the art.

SUMMARY

The present disclosure provides an ultrasonic touch device, a display device, and an ultrasonic touch method.

According to one aspect of the present disclosure, there is provided an ultrasonic touch device disposed at a periphery of a display area of an electronic equipment. The ultrasonic touch device includes an ultrasonic ranging module. The ultrasonic ranging module includes a plurality of ultrasonic ranging units arranged in a line for transmitting detected ultrasonic waves to the display area and receiving reflected ultrasonic waves reflected by a touch object on the display area, and recording a time interval between transmitting the detected ultrasonic waves and receiving the reflected ultrasonic waves. The ultrasonic touch device includes a first position determining unit configured to determine a distance between the touch object and the ultrasonic ranging module according to the time interval, and determine a first position of the touch object in a first coordinate direction of the display area according to the distance. The ultrasonic touch device includes a second position determining unit configured to determine a second position of the touch object in a second coordinate direction of the display area according to a position of an ultrasonic ranging unit that receives the reflected ultrasonic waves in the ultrasonic ranging module.

In an exemplary arrangement of the present disclosure, the ultrasonic ranging unit includes an ultrasonic transmitter and an ultrasonic receiver. The ultrasonic receiver is disposed in a laminated manner with the ultrasonic transmitter and parallel to a plane of the display area.

In an exemplary arrangement of the present disclosure, the ultrasonic touch device further includes a touch range determining unit configured to determine an effective touch range of the touch object according to an amount of the ultrasonic ranging units that receive the reflected ultrasonic waves.

In an exemplary arrangement of the present disclosure, the ultrasonic touch device further includes a preventing mistakenly touching unit configured to stop transmitting determined position information of the touch object on the display area to the electronic equipment when the effective touch range is not within a preset range.

In an exemplary arrangement of the present disclosure, the ultrasonic touch device further includes a communication unit connected to the electronic equipment. The communication unit includes one or more of a wired communication unit or a wireless communication unit configured to transmit determined position information of the touch object on the display area to the electronic equipment.

In an exemplary arrangement of the present disclosure, the wireless communication unit includes one or more of Bluetooth, Zigbee, and Wifi.

In an exemplary arrangement of the present disclosure, the ultrasonic touch device is disposed at a periphery of the electronic equipment by pasting, nesting or clamping.

In an exemplary arrangement of the present disclosure, the ultrasonic touch device has an ultrasonic frequency of 20,000 Hz or more.

In an exemplary arrangement of the present disclosure, the touch object includes one or more of a pencil, a pen, a ballpoint pen, a writing brush, an active pen, a passive pen, a toothpick, a cotton swab and a key.

According to one aspect of the present disclosure, there is provided a display device, including a display panel and any one of the ultrasonic touch devices described above.

According to one aspect of the present disclosure, there is provided an ultrasonic touch method, applied to the display device according to the present disclosure. The ultrasonic touch method includes transmitting detected ultrasonic waves to a display area of the display device at a preset transmission frequency. The ultrasonic touch method includes receiving reflected ultrasonic waves reflected by a touch object on the display area and recording a time interval between transmitting the detected ultrasonic waves and receiving the reflected ultrasonic waves. The ultrasonic touch method includes determining a distance between the touch object and the ultrasonic ranging module according to the time interval, and determining a first position of the touch object in a first coordinate direction of the display area according to the distance. The ultrasonic touch method includes determining a second position of the touch object in a second coordinate direction of the display area according to a position of an ultrasonic ranging unit that receives the reflected ultrasonic waves in the ultrasonic ranging module.

In an exemplary arrangement of the present disclosure, the ultrasonic touch method further includes determining an effective touch range of the touch object according to an amount of the ultrasonic ranging units that receive the reflected ultrasonic waves.

In an exemplary arrangement of the present disclosure, the ultrasonic touch method further includes stopping transmitting the determined first and second positions of the touch object on the display area to the electronic equipment when the effective touch range is not within a preset range.

In an exemplary arrangement of the present disclosure, the ultrasonic touch method further includes transmitting the determined first and second positions of the touch object on the display area to the electronic equipment.

In an exemplary arrangement of the present disclosure, transmitting determined position information of the touch object on the display area to the electronic equipment by one or more of Bluetooth, Zigbee, and Wifi.

In an exemplary arrangement of the present disclosure, an ultrasonic frequency is 20,000 Hz or more.

In an exemplary arrangement of the present disclosure, the touch object includes one or more of a pencil, a pen, a ballpoint pen, a writing brush, an active pen, a passive pen, a toothpick, a cotton swab and a key.

In an exemplary arrangement of the present disclosure, the transmission frequency is 100 times per second.

In an exemplary arrangement of the present disclosure, the method further includes establishing a communication connection between the ultrasonic touch device and the display device. The method further includes correcting specific positions in the display area of the display device using a touch object.

In an exemplary arrangement of the present disclosure, the method further includes after the communication connection between the ultrasonic touch device and the display device is established, displaying a plurality of points to be corrected corresponding to the specific positions in the display area of the display device.

It should be noted that, the above general description and following detailed description are illustrative and explanatory only but not restrictive to the present disclosure.

This section provides an overview of various implementations or examples of the techniques described in the present disclosure, and is not a comprehensive disclosure of all scopes or all features of the disclosed technology.

BRIEF DESCRIPTION OF THE DRAWINGS

The drawings herein are incorporated into the specification and form a part of this specification, which show arrangements in conformance with the present disclosure and serve to explain the principles of the present disclosure in conjunction with the specification. Obviously, the drawings in the following description are only some arrangements of the present disclosure. For those of ordinary skill in the art, other drawings can be obtained from these drawings without creative work.

DETAILED DESCRIPTION

Figure 1:
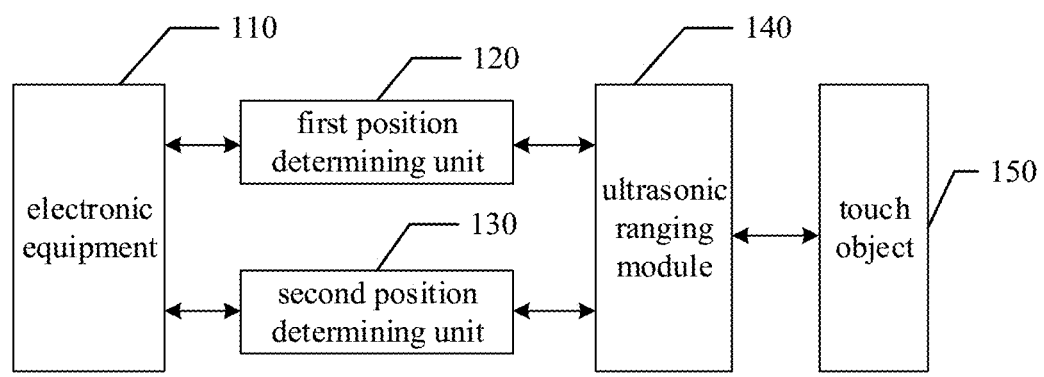
FIG. 1 schematically shows a block diagram of an ultrasonic touch device.

Example arrangements will now be described more fully with reference to the accompanying drawings. However, the example arrangements can be embodied in a variety of forms and should not be construed as being limited to the examples set forth herein; rather, these arrangements are provided so that this disclosure will be more complete and complete, and fully convey concepts of exemplary arrangements to those skilled in the art. The described features, structures, or characteristics may be combined in any suitable manner in one or more arrangements. In the following description, numerous specific details are set forth to provide full understanding of arrangements of the present disclosure. However, one skilled in the art will appreciate that one or more of the specific details may be omitted or other methods, components, devices, blocks, etc. may be employed to practice technical solutions of the present disclosure. In other instances, known technical solutions are not shown or described in detail, to avoid distracting and thus obscuring various aspects of the present disclosure.

Although relative terms such as "upper" and "lower" are used in the specification to describe a relative relationship of one component of the icon to another component, these terms are used in this specification for convenience only, for example, according to directions of examples described in the accompanying drawings. It will be understood that if the device of the icon is flipped upside down, the component described "above" will become the component "below". Other relative terms such as "high", "low", "top" and "bottom" also have similar meanings. When a structure is "on" another structure, it is possible that a structure is integrally formed on another structure, or that a structure is "directly" disposed on another structure, or that a structure is "indirectly" disposed on another structure through other structures.

The terms "a", "an", "the" and "said" are used to mean the presence of one or more elements/components, etc.; the terms "including", "including" and "having" are used to mean an open including and mean that there may be additional elements/components/etc. in addition to the listed elements/components/etc; the terms "first", "second", etc. are used only as marks, but not limited to the number of objects.

In addition, the drawings are merely schematic representations of the present disclosure and are not necessarily to draw to scale. The same reference numerals in the drawings denote the same or similar parts, and the repeated description thereof will be omitted. Some of the block diagrams shown in the figures are functional entities and do not necessarily have to correspond to physically or logically separate entities. These functional entities may be implemented in software, or implemented in one or more hardware modules or integrated circuits, or implemented in different network and/or processor devices and/or microcontroller devices.

In some capacitive touch screens, when a finger is in contact with a screen, the touch screen calculates a position of the finger by a current generated by a capacitance change, so nails or ordinary pens cannot touch the above capacitive touch screen; further, an accuracy of the capacitive touch screen can reach several pixels in theory, but an actual effective range is about 1 square centimeter. Therefore, existing capacitive touch screen mobile phones generally use fingers for touch.

However, using a finger for touch has following disadvantages: on one hand, by using a finger to write or draw a picture on a capacitive touch screen, lines of the handwriting are quite thick, and precision of the stroke is poorly controlled, and it cannot achieve a desired effect to draw a straight line on the screen or write in margin of an article; on the other hand, since more and more applications, such as painting software, require more precise touches, but it is difficult to accurately and quickly write on a small screen because of the limitations of finger operation.

Based on above technical problems, various handwriting pens applied to the touch screen have been produced. As the use of handwriting pens has become wider, the performance requirements for the handwriting pens have become higher and higher. The handwriting pens currently widely used may include an active capacitive pen, but since it is a handwriting pen scheme implemented on basis of the hardware of the existing capacitive touch screen system, it is inevitable to consider the light transmission property. Thus, the sensor wiring area is seriously affected, which limits the size of the Sensor Pitch (the spacing between the sensors), resulting in low precision. Moreover, since a diameter of a pen head of the active capacitive pen is large and thus the accuracy of the control is not high, relatively accurate touch operation on a large touch screen cannot be achieved. It should be further noted that the active capacitive pens widely used currently are not perfectly compatible with finger touch on most products, that is, it is not possible to touch by hand at the same time when the pen is used, thus limiting the user experience.

The present exemplary arrangement provides an ultrasonic touch device, disposed at a periphery of a display area of an electronic equipment, and the ultrasonic touch device includes an ultrasonic ranging module that includes a plurality of ultrasonic ranging units arranged in a line for transmitting detected ultrasonic waves to the display area and receiving reflected ultrasonic waves reflected by a touch object on the display area, and recording a time interval between transmitting the detected ultrasonic waves and receiving the reflected ultrasonic waves. The ultrasonic touch device includes a first position determining unit, configured to determine a distance between the touch object and the ultrasonic ranging module according to the time interval, and determine a position of the touch object in a first coordinate direction of the display area according to the distance. The ultrasonic touch device includes a second position determining unit, configured to determine a position of the touch object in a second coordinate direction of the display area according to a position of an ultrasonic ranging unit that receives the reflected ultrasonic waves in the ultrasonic ranging module.

In the above-mentioned ultrasonic touch device, on one hand, the electronic equipment can, according to a coordinate of the touch object, execute a program corresponding to the coordinate, so that the electronic equipment having no touch function realizes the touch function and improves the user experience; on the other hand, the ultrasonic touch device has fewer components, so the manufacturing process is simple and the cost is low; since the electronic equipment having no touch function itself can achieve the touch function by externally connecting the equipment, the manufacturing cost of configuring a touch screen for the electronic equipment is reduced.

The respective portions of the above-described ultrasonic touch device in the present exemplary arrangement will be explained and described in detail below.

Figure 2:
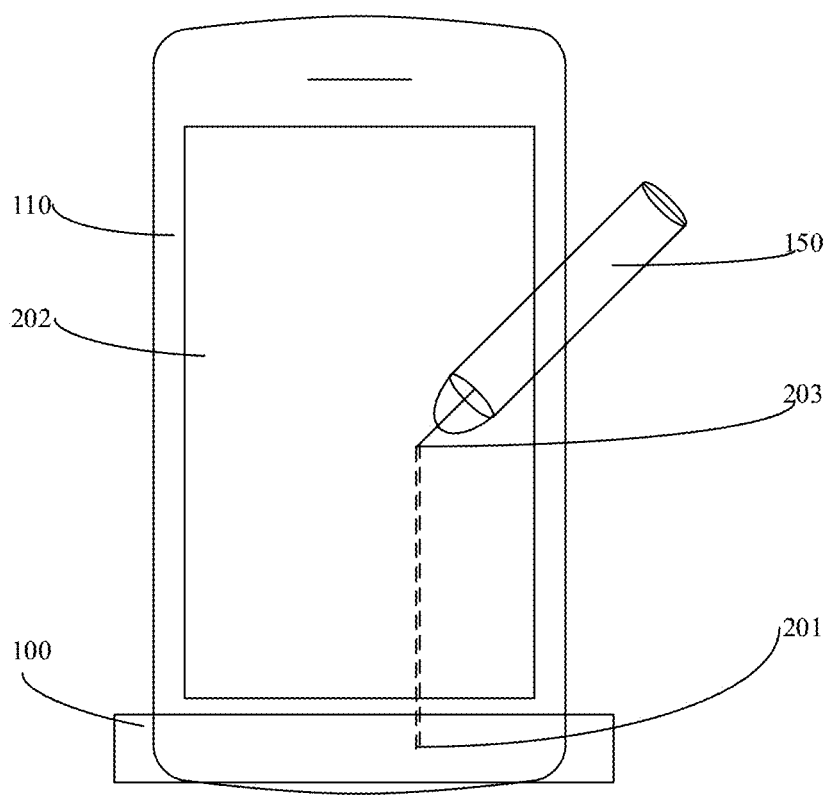
FIG. 2 schematically shows an exemplary diagram of an ultrasonic touch device.

First, the above electronic equipment will be explained and described in detail. Referring to FIG. 1 and FIG. 2, the electronic equipment 110 may be an electronic equipment having a display function, and may include, for example, a mobile phone, a display, a television, a notebook, or a tablet computer, etc., which is not particularly limited in this example. The touch device may include a common handwriting pen, such as a pencil, a pen, a ballpoint pen, a writing brush, an active pen, a passive pen with a fine pen tip, etc., and may also include ordinary daily necessities, such as a toothpick, a cotton swab or a key, or the like, and may also be other structures that can be used as touch devices, which is not specifically limited in this example.

Next, the ultrasonic touch device will be explained and described in detail. Continuing to refer to FIGS. 1 and 2, the ultrasonic touch device 100 may be disposed at a periphery of the electronic equipment 100 by nesting, clamping, magnetically attaching or pasting. For example, the electronic equipment 100 may be disposed in a non-display area under the display area, etc., or it can be placed directly at the periphery of the electronic equipment, and this example does not impose any special restrictions. By disposing the touch device 100 at the periphery of the electronic equipment, the transmittance and display effect of the display area of the electronic equipment will not be affected, and the user experience is improved. In addition, through the manner of nesting or pasting, the user can assemble or disassemble at any time, which is convenient and quick.

Figure 3:
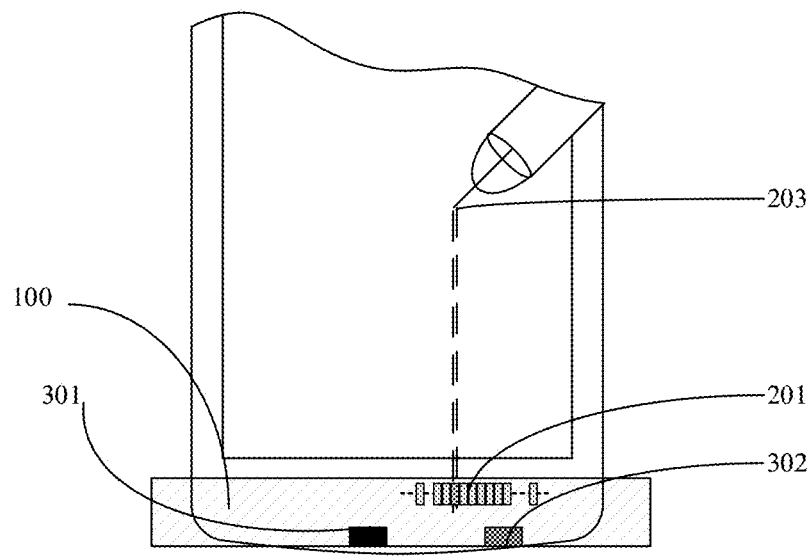
FIG. 3 schematically shows another exemplary diagram of an ultrasonic touch device.
Figure 4:
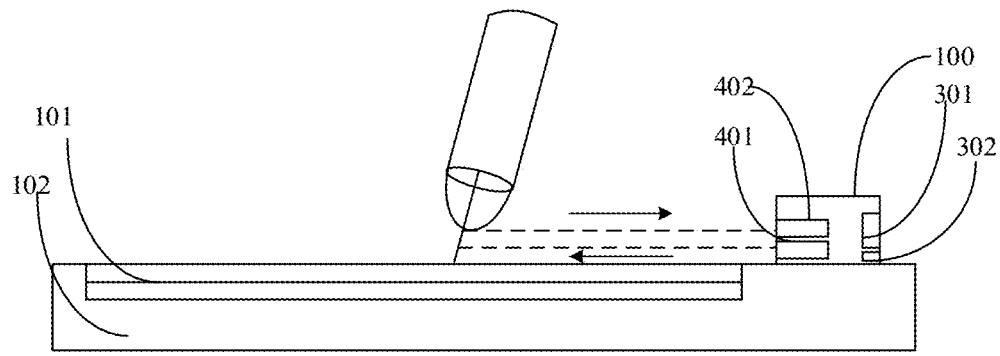
FIG. 4 schematically shows an exemplary diagram of a principle of an ultrasonic touch device.

Further, the ultrasonic ranging module is explained and described in detail. Referring to FIG. 3 and FIG. 4, the ultrasonic ranging module 140 includes a plurality of ultrasonic ranging units 201 arranged in a line. A distance of each ultrasonic ranging unit 201 can be differently set according to different precisions. For example, it may be 0.2 mm in this example arrangement. Further, the ultrasonic ranging unit 201 may include an ultrasonic transmitting device 401 and an ultrasonic receiving device 402. The ultrasonic transmitting device 401 and the ultrasonic receiving device 402 may be arranged in a laminated parallel arrangement manner with respect to a plane of the display region 202. For example, it may be set in the manner of up and down parallel arrangement shown in FIG. 4; and it may be set in other manners, for example, may be set in a linear arrangement, which is not particularly limited in this example. In addition, the ultrasonic ranging module 140 may further include a timer 501, which may be used to record a time interval between the transmission of detected ultrasonic waves by the ultrasonic transmitting device 401 and the receiving of reflected ultrasonic waves by the ultrasonic receiving device 402 (this time interval may be recorded as T). The timer 501 may include an electromagnetic dotting timer or a spark timer, etc., and it may also include other timers, such as a reaction timer or an amplification timer, etc., which is not particularly limited in this example. It should be additionally noted here that the above-mentioned ultrasonic transmitting device 401 can transmit the detected ultrasonic waves to a display area 202 of the electronic equipment 110 at a preset transmitting frequency (for example, 100 Hz, 100 times per second); and then the ultrasonic receiving device 402 receives the reflected ultrasonic waves reflected by a touch object 150 on the display area 202.

Further, the first position determining unit and the second position determining unit are explained and described in detail. Referring to FIG. 1 and FIG. 3, the first position determining unit 120 and the second position determining unit 130 may be integrated in an MCU (microprocessor). The first position determining unit 120 may be configured to determine a distance between the touch object 150 and the ultrasonic ranging module 140 according to the reflected ultrasonic waves, and determine a position of the touch object 150 in a first coordinate direction of the display area 202 (for example, which may be a position in the y-axis direction) according to the distance. The second position determining unit 130 may be configured to determine a position of the touch object 150 in a second coordinate direction of the display area 202 (for example, which may be a position in the x-axis direction) according to a position of an ultrasonic ranging unit 201 that receives the reflected ultrasonic waves in the ultrasonic ranging module 140. It should be added here that the direction of the x-axis can be parallel to one side of the display area, and the direction of the y-axis can be perpendicular to the side of the display area, so it can be understood that the direction of the x-axis can be perpendicular to the direction of the y-axis.

Next, the first position determining unit and the second position determining unit are further described in detail. Referring to FIG. 2, FIG. 3 and FIG. 4, the ultrasonic transmitting device 401 can transmit the detected ultrasonic waves to the display area 202 of the electronic equipment 110 at a transmission frequency of 100 Hz. When the touch object 150 appears in the display area 202, the detected ultrasonic waves touch the touch object, and then reflect. Then, the ultrasonic receiving device 402 receives the reflected ultrasonic wave. The frequency of the detected ultrasonic wave may be more than 20000 Hz. By transmitting ultrasonic waves with a frequency above 20,000 Hz, interference to the ultrasonic touch device from other noises (such as human voices or sounds from other objects) are avoided. Further, the ultrasonic transmission speed is extremely fast, and thus the measurement accuracy, the reaction speed, and the anti-interference ability and the like of the touch device can be greatly improved. Then, the first position determining unit 120 determines the distance between the touch object 150 and the ultrasonic ranging module 140 according to the reflected ultrasonic wave, and determines the position of the touch object 150 in the first coordinate direction of the display area 202 (for example it may be a position in the y-axis direction) according to the distance. The distance is calculated as: $L=C \times T/2$, where C is the propagation speed of the ultrasonic wave in the air; and T is the time difference from transmission to the reception of the ultrasonic wave. Further examples are illustrated below.

Figure 5:
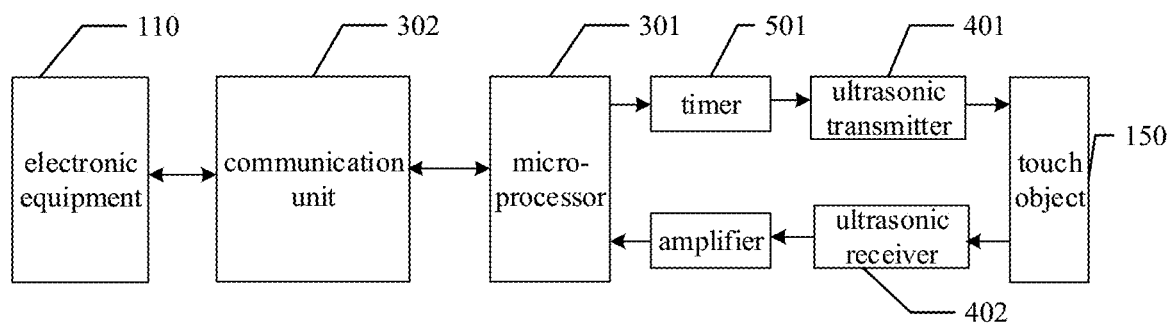
FIG. 5 schematically shows another block diagram of an ultrasonic touch device.

Referring to FIG. 4 and FIG. 5, the ultrasonic transmitting device 401 transmits ultrasonic detected waves in the direction of the display region 202. At the same time, the timer 501 starts timing. The ultrasonic waves propagate in the air, touch one end 203 of the touch object on the way and return. When the ultrasonic receiving device 402 receives the reflected waves, the timer 501 immediately stops timing. The propagation speed of the ultrasonic wave in the air is 340 m/s. According to the time T recorded by the timer, the distance L from the transmission point to the obstacle can be calculated, where $L=C \times T/2=340 \times T/2$.

Further, after the ultrasonic wave receiving device 402 receives the reflected waves, the second position determining unit 130 determines a position of the touch object 150 in a second coordinate direction of the display area 202 (for example, it may be the position in the x-axis direction) according to a position of an ultrasonic ranging unit 201 that receives the reflected ultrasonic waves in the ultrasonic ranging module 140. It should be noted that, the position of the ultrasonic ranging unit 201 in the ultrasonic ranging module 140 may be a sequential position of the ultrasonic ranging unit in the ultrasonic ranging module (the sequence of the ultrasonic ranging unit from the coordinate origin), and may also be a distance position (the distance between the ultrasonic ranging unit and the coordinate origin), which is not particularly limited in this example. Further, the coordinate origin may be the position of the first ranging unit of the ultrasonic ranging module, or may be a position of an intermediate ranging unit of the ultrasonic ranging module, which is not particularly limited in this example. In the present example, it is assumed that the distance between the ultrasonic ranging unit 201 that receives the reflected ultrasonic waves and the coordinate origin is H, and then the position of the touch object 150 in the display region 202 is (H, $340 \times T/2$).

Further, the ultrasonic touch device further includes a touch range determining unit configured to determine an effective touch range of the touch object according to an amount of the ultrasonic ranging units that receive the reflected ultrasonic waves.

Specially, the touch range determining unit may be integrated in the microprocessor 301 together with the first position determining unit and the second position determining unit. The touch range determining unit may be configured to determine an effective touch range of the touch object according to an amount of the ultrasonic ranging units that receive the reflected ultrasonic waves. For example, when a certain position in the touch display area is touched, a corresponding number (one or more) of the ultrasonic ranging unit 201 may be triggered. Then an effective touch range of the touch object may be calculated according to the number of triggered ultrasonic ranging units. Further, for example, if a pen is selected as the touch object and the number of the ultrasonic ranging unit triggered by the touch objected is 5, the touch range determining unit will set the effective touch range as 4-6 adjacent ultrasonic ranging units. Since the pitch between respective ultrasonic ranging units is 0.2 mm, the effective touch range of the touch object is 0.8 mm to 1.2 mm. In addition, in other exemplary arrangements of the present disclosure, the effective touch range may also be other values. For example, the effective touch range of the cotton swab is 2 mm-3 mm, etc., and the example does not specifically limit this. By setting the effective touch range, it can avoid the influence of other touch objects on the touch function in the effective touch range.

Further, the above ultrasonic touch device may further include a preventing mistakenly touching unit, configured to not transmit determined position information of the touch object on the display area to the electronic equipment when the effective touch range is not within a preset range.

Specially, the above preventing mistakenly touching unit is integrated in the microprocessor 301 together with the above touch range determining unit, the first position determining unit and the second position determining unit. The preventing mistakenly touching unit may be configured to not transmit determined position information of the touch object on the display area to the electronic equipment when the effective touch range is not within a preset range. For example, when the effective touch range is 1 cm-2 cm which exceeds the preset range, the current touch behavior is not processed. When the current touch range is 1.0 mm, the position of the current touch object on the display area is calculated. By setting the preventing mistakenly touching unit, it can prevent the interference of fingers or other objects. Since the touch range (1 cm) of the finger is much larger than the preset range, the finger and the touch object can be prevented from interfering with each other, such that the same electronic equipment may support finger touch or touch from other touch objects at the same time, which improves the user experience.

Finally, the above ultrasonic touch device may further include a communication unit, connected to the electronic equipment, including one or more of a wired communication unit or a wireless communication unit, and configured to transmit determined position information of the touch object on the display area to the electronic equipment.

Specially, the above ultrasonic touch device 100 further includes a communication unit 302. The communication unit 302 can be configured to transmit the determined position information of the touch object 150 on the display area to the electronic equipment 110. For example, when the first position determining unit and the second position determining unit determine that the position information of the touch object on the display area is (H, 340*t/2), the position information is sent to the communication unit. Then the communication unit transmits the position information by wired communication or wireless communication to the electronic equipment, to enable the electronic equipment to perform related operations at the corresponding position according to the position information. The wireless communication unit may include Bluetooth, Zigbee, Wifi, etc., which is not specifically limited in this example. By setting the wired communication mode or wireless communication mode, it can enable the ultrasonic touch device 100 and the electronic equipment 110 to communicate under any circumstances, thus improving the user experience.

Figure 6:
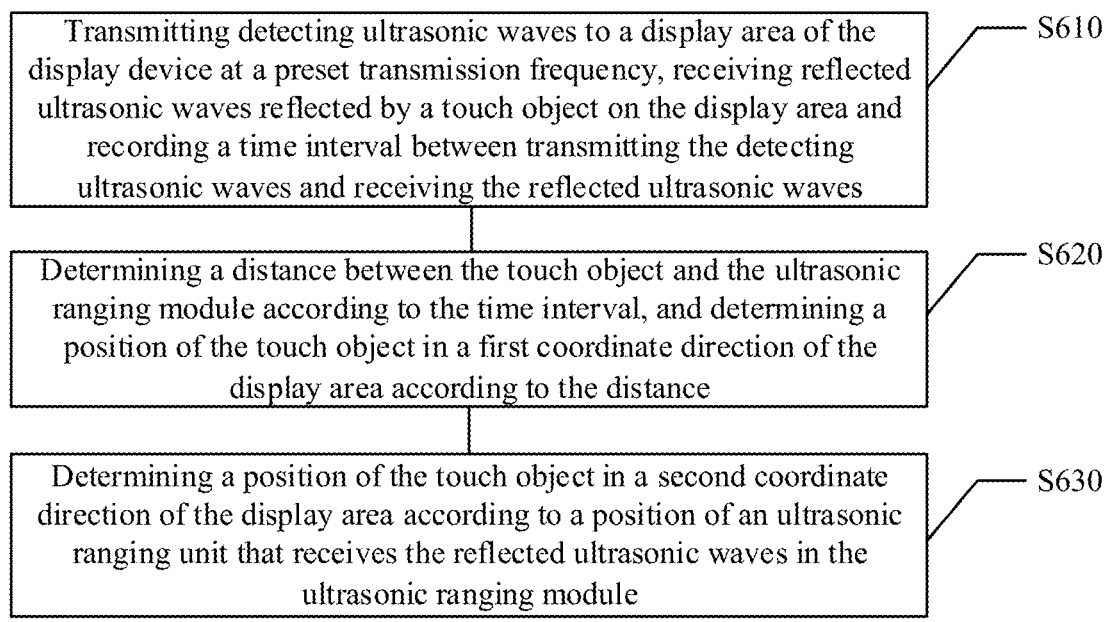
FIG. 6 schematically shows an exemplary diagram of an ultrasonic touch method.

The exemplary arrangement further provides an ultrasonic ranging method applied to a display device. The display device may include a display panel and the above-described ultrasonic touch device. Referring to FIG. 6, the ultrasonic ranging method may include blocks S610 to S630.

In block S610, detected ultrasonic waves are transmitted to a display area of the display device at a preset transmission frequency, reflected ultrasonic waves reflected by a touch object on the display area are received, and a time interval between the detected ultrasonic waves and the reflected ultrasonic waves is recorded.

In the present exemplary arrangement, first, the ultrasonic transmitting device 401 of the plurality of ultrasonic ranging units 201 in the ultrasonic ranging module 140 transmits ultrasonic waves with a frequency more than 20,000 Hz to the display area 202 of the electronic equipment 110 at a predetermined transmitting frequency (for example, may be 100 Hz). The detected ultrasonic waves return immediately when contacting the touch object 150, and then the ultrasonic receiving device 402 receives the reflected ultrasonic waves reflected by the touch object 150. A time interval between the transmission of the detected ultrasonic waves from the ultrasonic transmitting device 401 and the reception of the reflected ultrasonic waves by the ultrasonic receiving device 402 is recorded.

In block S620, a distance between the touch object and the ultrasonic ranging module is determined according to the time interval, and a position of the touch object in a first coordinate direction of the display area is determined according to the distance.

In the present exemplary arrangement, after receiving the transmitted ultrasonic wave, the first position determining unit 120 determines the distance between the touch object 150 and the ultrasonic ranging module 140 according to the time interval, and determines the position of the touch object 150 in the first coordinate direction of the display area 202 (for example, it may be the position in the y-axis direction) according to the distance. The distance is calculated as: $L=C\times T/2$, where C is the propagation speed of the ultrasonic wave in the air; T is the time interval from the transmission to the reception of the ultrasonic wave i.

In block S630, a position of the touch object in a second coordinate direction of the display area is determined according to a position of an ultrasonic ranging unit that receives the reflected ultrasonic waves in the ultrasonic ranging module.

In the present exemplary arrangement, after the ultrasonic wave receiving device 402 receives the reflected waves, the second position determining unit 130 determines a position of the touch object 150 in a second coordinate direction of the display area 202 (for example, it may be the position in the x-axis direction) according to a position of an ultrasonic ranging unit 201 that receives the reflected ultrasonic waves in the ultrasonic ranging module 140. It should be noted that, the position of the ultrasonic ranging unit 201 in the ultrasonic ranging module 140 may be a sequential position of the ultrasonic ranging unit in the ultrasonic ranging module (the sequence of the ultrasonic ranging unit from the coordinate origin), and may also be a distance position (the distance between the ultrasonic ranging unit and the coordinate origin), which is not particularly limited in this example. Further, the coordinate origin may be the position of the first ranging unit of the ultrasonic ranging module, or may be a position of an intermediate ranging unit of the ultrasonic ranging module, which is not particularly limited in this example.

In another arrangement of the present disclosure, the ultrasonic touch method further includes determining an effective touch range of the touch object according to an amount of the ultrasonic ranging units that receive the reflected ultrasonic waves.

Specially, the touch range determining unit in the microprocessor 301 determines the effective touch range of the touch object according to an amount of the ultrasonic ranging units that receive the reflected ultrasonic waves. For example, when a certain position in the touch display area is touched, a corresponding number (one or more) of the ultrasonic ranging unit 201 may be triggered. Then an effective touch range of the touch object may be calculated according to the number of triggered ultrasonic ranging units. Further, for example, if a pen is selected as the touch object and the number of the ultrasonic ranging unit triggered by the touch objected is 5, the touch range determining unit will set the effective touch range as 4-6 adjacent ultrasonic ranging units. Since the pitch between respective ultrasonic ranging units is 0.2 mm, the effective touch range of the touch object is 0.8 mm to 1.2 mm. In addition, in other exemplary arrangements of the present disclosure, the effective touch range may also be other values. For example, the effective touch range of the cotton swab is 2 mm-3 mm, etc., and the example does not specifically limit this. By setting the effective touch range, it can avoid the influence of other touch objects on the touch function in the effective touch range. For example, when the effective touch range is 0.8 mm-1.2 mm, it can be understood that the touch object is required to perform operations of higher precision.

In another arrangement of the present disclosure, the ultrasonic touch method further includes: stopping transmitting determined position information of the touch object on the display area to the electronic equipment when the effective touch range is not within a preset range.

Specially, the preventing mistakenly touching unit in the microprocessor 301 may be configured to not transmit determined position information of the touch object on the display area to the electronic equipment when the effective touch range is not within a preset range. For example, when the effective touch range is 1 cm-2 cm which exceeds the preset range, the current touch behavior is not processed. When the current touch range is 1.0 mm, the position of the current touch object on the display area is calculated. By setting the preventing mistakenly touching unit, it can prevent the interference of fingers or other objects. Since the touch range (1 cm) of the finger is much larger than the preset range, the finger and the touch object can be prevented from interfering with each other, such that the same electronic equipment may support finger touch or touch from other touch objects at the same time, which improves the user experience.

Further, the ultrasonic touch method further includes: establishing a communication connection between the ultrasonic touch device and the display device; and after the connection, correcting specific positions in the display area of the electronic equipment using a touch object.

Specially, when the ultrasonic touch device is connected to the electronic equipment through Bluetooth or USB, a plurality of points to be corrected may appear in the display area of the electronic equipment (for example, which may be four vertices and a central position etc. of the display area), and then the display area is corrected by using one touch object. The accuracy of the touch device can be further improved by correcting the display area of the electronic equipment.

The present disclosure relates to an ultrasonic touch device and method. When it is monitored that a touch device appears in a display area, the distance between the touch point and the ultrasonic ranging unit is measured by the ultrasonic ranging unit, and the trigger position of the ultrasonic ranging unit is determined. And then the first position determining unit is used to obtain the position of the touch point in the first coordinate direction of the display area according to the distance and the trigger position, and then the second position determining unit is used to determines the position of the touch object in the second coordinate direction of the display area according to the position of the ultrasonic ranging unit that receives the reflected ultrasonic waves in the ultrasonic ranging module. On one hand, the electronic equipment can, according to a coordinate of the touch object, execute a program corresponding to the coordinate, so that the electronic equipment having no touch function realizes the touch function and improves the user experience; on the other hand, the ultrasonic touch device has fewer components, so the manufacturing process is simple and the cost is low; since the electronic equipment having no touch function itself can achieve the touch function by externally connecting the equipment, the manufacturing cost of configuring a touch screen for the electronic equipment is reduced.

In addition, although various blocks of the method of the present disclosure are described in a particular order in the figures, this is not required or implied that the blocks must be performed in the specific order, or all the blocks shown must be performed to achieve the desired result. Additionally or alternatively, certain blocks may be omitted, a plurality of blocks may be combined into one block for execution, and/or one block may be decomposed into a plurality of blocks for execution and the like.

Other arrangements of the present disclosure will be apparent to those skilled in the art after considering the specification and practicing the disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and arrangements are to be regarded as illustrative only, and the true scope and spirit of the present disclosure is indicated by the appended claims.

What is claimed is:

1. An ultrasonic touch device, disposed at a periphery of a display area of an electronic equipment, and the ultrasonic touch device comprising:
    an ultrasonic ranging module, comprising a plurality of ultrasonic ranging units arranged in a second coordinate direction at only a part of the periphery of the display area of the electronic equipment, wherein each ultrasonic ranging unit is configured for transmitting an ultrasonic wave in a first coordinate direction to the display area and receiving a reflected ultrasonic wave reflected in a direction opposite to the first coordinate direction by a touch object on the display area, and the ultrasonic ranging module is configured for recording a time interval between transmitting the ultrasonic wave and receiving the reflected ultrasonic wave, wherein the first coordinate direction is perpendicular to the second coordinate direction;
    a first position determining unit, configured to determine a distance in the first coordinate direction between the touch object and the ultrasonic ranging module according to the time interval, and determine a first position of the touch object in the first coordinate direction of the display area according to the distance; and
    a second position determining unit, configured to determine a second position of the touch object in the second coordinate direction of the display area according to a coordinate origin and a position in the second coordinate direction of an ultrasonic ranging unit that receives the reflected ultrasonic waves, wherein one of the plurality of ultrasonic ranging units is located at the coordinate origin, and wherein each ultrasonic ranging unit comprises an ultrasonic transmitter and an ultrasonic receiver that is disposed in a laminated manner with the ultrasonic transmitter and parallel to a plane of the display area.

2. The ultrasonic touch device of claim 1, wherein the ultrasonic touch device further comprises:
    a touch range determining unit, configured to determine an effective touch range of the touch object according to an amount of the ultrasonic ranging units that receive the reflected ultrasonic wave.

3. The ultrasonic touch device of claim 2, wherein the ultrasonic touch device further comprises:
    a preventing mistakenly touching unit, configured to stop transmitting the determined first and second positions of the touch object on the display area to the electronic equipment when the effective touch range is not within a preset range.

4. The ultrasonic touch device of claim 1, wherein the ultrasonic touch device further comprises:
    a communication unit, connected to the electronic equipment, comprising one or more of a wired communication unit or a wireless communication unit, and configured to transmit the determined first and second positions of the touch object on the display area to the electronic equipment.

5. The ultrasonic touch device of claim 1, wherein the ultrasonic touch device further comprises:
    a wireless communication unit, connected to the electronic equipment, and configured to transmit the determined first and second positions of the touch object on the display area to the electronic equipment, wherein the wireless communication unit comprises one or more of Bluetooth, Zigbee, and Wifi.

6. The ultrasonic touch device of claim 1, wherein the ultrasonic touch device is disposed at a periphery of the electronic equipment by pasting, nesting or clamping.

7. The ultrasonic touch device of claim 1, wherein the ultrasonic touch device has an ultrasonic frequency of 20,000 Hz or more.

8. The ultrasonic touch device of claim 1, wherein the touch object comprises one or more of a pencil, a pen, a ballpoint pen, a writing brush, an active pen, a passive pen, a toothpick, a cotton swab and a key.

9. A display device, comprising a display panel and an ultrasonic touch device,
wherein the ultrasonic touch device is disposed at a periphery of a display area of an electronic equipment, and the ultrasonic touch device comprises:
an ultrasonic ranging module, comprising a plurality of ultrasonic ranging units arranged in a second coordinate direction at only a part of the periphery of the display area of the electronic equipment, wherein each ultrasonic ranging unit is configured for transmitting an ultrasonic wave in a first coordinate direction to the display area and receiving a reflected ultrasonic wave reflected in a direction opposite to the first coordinate direction by a touch object on the display area, and the ultrasonic ranging module is configured for recording a time interval between transmitting the ultrasonic wave and receiving the reflected ultrasonic wave, wherein the first coordinate direction is perpendicular to the second coordinate direction;
a first position determining unit, configured to determine a distance in the first coordinate direction between the touch object and the ultrasonic ranging module according to the time interval, and determine a first position of the touch object in the first coordinate direction of the display area according to the distance; and
a second position determining unit, configured to determine a second position of the touch object in the second coordinate direction of the display area according to a coordinate origin and a position in the second coordinate direction of an ultrasonic ranging unit that receives the reflected ultrasonic waves in the ultrasonic ranging module, wherein
one of the plurality of ultrasonic ranging units is located at the coordinate origin, and
each ultrasonic ranging unit comprises an ultrasonic transmitter, and an ultrasonic receiver that is disposed in a laminated manner with the ultrasonic transmitter and parallel to a plane of the display area.

10. An ultrasonic touch method, applied to a display device comprising a display panel and an ultrasonic touch device,
wherein the ultrasonic touch device is disposed at a periphery of a display area of an electronic equipment, and the ultrasonic touch device comprises:
an ultrasonic ranging module, comprising a plurality of ultrasonic ranging units arranged in a second coordinate direction at only a part of the periphery of the display area of the electronic equipment, wherein each ultrasonic ranging unit is configured for transmitting an ultrasonic wave in a first coordinate direction to the display area and receiving a reflected ultrasonic wave reflected in a direction opposite to the first coordinate direction by a touch object on the display area, and the ultrasonic ranging module is configured for recording a time interval between transmitting the ultrasonic wave and receiving the reflected ultrasonic wave, wherein the first coordinate direction is perpendicular to the second coordinate direction;
a first position determining unit, configured to determine a distance in the first coordinate direction between the touch object and the ultrasonic ranging module according to the time interval, and determine a first position of the touch object in the first coordinate direction of the display area according to the distance; and
a second position determining unit, configured to determine a second position of the touch object in the second coordinate direction of the display area according to a coordinate origin and a position in the second coordinate direction of an ultrasonic ranging unit that receives the reflected ultrasonic wave in the ultrasonic ranging module, wherein
one of the plurality of ultrasonic ranging units is located at the coordinate origin, and
each ultrasonic ranging unit comprises an ultrasonic transmitter, and an ultrasonic receiver that is disposed in a laminated manner with the ultrasonic transmitter and parallel to a plane of the display area,
wherein the ultrasonic touch method comprises:
transmitting the ultrasonic wave in the first coordinate direction to the display area of the display device at a preset transmission frequency, receiving the reflected ultrasonic wave reflected by the touch object on the display area and recording the time interval between transmitting the ultrasonic wave and receiving the reflected ultrasonic wave;
determining the distance between the touch object and the ultrasonic ranging module according to the time interval, and determining the first position of the touch object in the first coordinate direction of the display area according to the distance; and
determining the second position of the touch object in the second coordinate direction of the display area according to the position of an ultrasonic ranging unit that receives the reflected ultrasonic wave in the ultrasonic ranging module.

11. The ultrasonic touch method of claim 10, wherein the ultrasonic touch method further comprises:
determining an effective touch range of the touch object according to an amount of the ultrasonic ranging units that receive the reflected ultrasonic wave.

12. The ultrasonic touch method of claim 11, wherein the ultrasonic touch method further comprises:
stopping transmitting the determined first and second positions of the touch object on the display area to the electronic equipment when the effective touch range is not within the preset range.

13. The ultrasonic touch method of claim 11, further comprising:
transmitting the determined first and second positions of the touch object on the display area to the electronic equipment.

14. The ultrasonic touch method of claim 13, wherein transmitting determined position information of the touch object on the display area to the electronic equipment by one or more of Bluetooth, Zigbee, and Wifi.

15. The ultrasonic touch method of claim 11, wherein an ultrasonic frequency is 20,000 Hz or more.

16. The ultrasonic touch method of claim 11, wherein the touch object comprises one or more of a pencil, a pen, a ballpoint pen, a writing brush, an active pen, a passive pen, a toothpick, a cotton swab and a key.

17. The ultrasonic touch method of claim 11, wherein the transmission frequency is 100 times per second.

18. The ultrasonic touch method of claim 11, further comprising:
- establishing a communication connection between the ultrasonic touch device and the display device; and
- correcting specific positions in the display area of the display device using the touch object.

19. The ultrasonic touch method of claim 18, further comprising:
- after the communication connection between the ultrasonic touch device and the display device is established, displaying a plurality of points to be corrected corresponding to the specific positions in the display area of the display device.

* * * * *